US011965759B2

(12) United States Patent
Van Groenestijn et al.

(10) Patent No.: US 11,965,759 B2
(45) Date of Patent: Apr. 23, 2024

(54) DEVICE AND METHOD FOR PERFORMING ULTRASONIC MEASUREMENTS OF FLUID PROPERTIES

(71) Applicant: Nederlandse Organisatie voor toegepast-natuurwetenschappelijk onderzoek TNO, 's-Gravenhage (NL)

(72) Inventors: Gert-Jan Adriaan Van Groenestijn, Rijswijk (NL); Paul Louis Maria Joseph Van Neer, Bergschenhoek (NL); Fokko Pieter Wieringa, Elst (NL); Arno Willem Frederik Volker, Delft (NL); Lun Kai Cheng, Krimpen aan den Ijssel (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 278 days.

(21) Appl. No.: 17/413,350

(22) PCT Filed: Dec. 16, 2019

(86) PCT No.: PCT/NL2019/050838
§ 371 (c)(1),
(2) Date: Jun. 11, 2021

(87) PCT Pub. No.: WO2020/122728
PCT Pub. Date: Jun. 18, 2020

(65) Prior Publication Data
US 2022/0026251 A1 Jan. 27, 2022

(30) Foreign Application Priority Data
Dec. 14, 2018 (EP) .................................. 18212682

(51) Int. Cl.
*G01F 1/661* (2022.01)
*G01F 1/66* (2022.01)

(52) U.S. Cl.
CPC .............. *G01F 1/661* (2013.01); *G01F 1/662* (2013.01)

(58) Field of Classification Search
CPC ................................ G01F 1/661; G01F 1/662
(Continued)

(56) References Cited

U.S. PATENT DOCUMENTS 5,297,436 A * 3/1994 Chan ...................... G01H 9/004
385/13
5,381,695 A * 1/1995 Payne ..................... B29C 37/04
73/653

(Continued)

FOREIGN PATENT DOCUMENTS

WO WO 2006/031106 A1 3/2006
WO WO 2015/160235 A1 10/2015

OTHER PUBLICATIONS

European Patent Office, International Search Report in corresponding International Application No. PCT/NL2019/050838, dated Jan. 27, 2020 (3 pages).
(Continued)

Primary Examiner — Nathaniel T Woodward
(74) Attorney, Agent, or Firm — Leydig, Voit & Mayer, Ltd.

(57) ABSTRACT

Ultrasonic measurements of fluid properties are performed with the aid of an optical fiber or a package of optical fibers by exciting ultrasound waves at a first location along the optical fiber in the fluid by means of light from the optical fiber and detecting an effect of the ultrasound waves on light reflection or propagation in the optical fiber and/or a further
(Continued)

optical fiber in the package at a second location along the optical fiber or at the end of the optical fiber.

23 Claims, 4 Drawing Sheets

(58) Field of Classification Search
USPC .......................................................... 73/1.16
See application file for complete search history.

(56) References Cited

U.S. PATENT DOCUMENTS

| | | | |
|---|---|---|---|
| 5,419,334 A * | 5/1995 | Miyagawa | A61B 8/4461 600/463 |
| 6,644,128 B1 * | 11/2003 | Byatt | G01F 1/667 73/861.26 |
| 2006/0126435 A1 | 6/2006 | Tam et al. | |
| 2014/0255023 A1 | 9/2014 | Kishida et al. | |
| 2016/0298445 A1 * | 10/2016 | Al-Khalifa | G01F 1/66 |
| 2018/0080812 A1 | 3/2018 | Wu et al. | |

OTHER PUBLICATIONS

Xiaolong Dong et al., "Multipoint Fiber-Optic Laser-Ultrasound Generation Along a Fiber Based on the Core-Offset Splicing of Fibers," Photonics Research, vol. 5, No. 4, pp. 287-292, Aug. 2017.

* cited by examiner

DEVICE AND METHOD FOR PERFORMING ULTRASONIC MEASUREMENTS OF FLUID PROPERTIES

CROSS-REFERENCE TO RELATED APPLICATIONS

This patent application is a U.S. National Phase of PCT International Application No. PCT/NL2019/050838, filed Dec. 16, 2019, which claims priority to European Application No. 18212682.1, filed Dec. 14, 2018, which are both expressly incorporated by reference in their entireties, including any references contained therein.

FIELD OF THE INVENTION

The invention relates to a device and method for performing ultrasonic measurements of fluid properties.

BACKGROUND

It is known to determine fluid properties such as fluid flow speed, density and the size distribution of suspended particles from measurements on ultrasound transmission through the fluid. This requires use of an ultrasound transmitter and an ultrasound detector coupled to the fluid. Usually, the measurements are performed on fluid that flows through a pipe. In that case the transmitter and the detector may be provided on the interior or exterior of the wall of the pipe. There are limits on the accuracy of such measurements. For example when the speed of ultrasound travel is measured using the time delay between transmission and detection, the detection may be affected by reflection of ultrasound waves via the pipe wall. Moreover, it is desirable that such measurements can be performed in harsh environments or environments that are hard to access, such as in pipes in bore holes or in the presence of explosive substances.

US2016298445 discloses the use of two separate optical fibers to monitor parameters of a fluid that flows through a tube. Ultrasound that travels through the fluid between a signal generation gauge in a first optical fiber at a part of the wall of the tube to a detection point located along a second optical fiber on a different part of the wall of the tube, preferably on the opposite side of the wall.

U.S. Pat. No. 6,644,128 discloses a flow meter that measures flow using a light emitter and a sound detector, with a flowing fluid in between. The light has a wavelength that is matched to the flowing medium so that sound is produced by a photo-acoustic effect. The travel time of the generated sound to the sound detector is measured.

A specific form of laser ultrasound generation at points along an optical fiber in general is described in an article by Xiaolong Dong et al. titled "Multipoint fiber-optic laser-ultrasound generation along a fiber based on the core-offset of fibers", published in Photonics Research Vol. 5 (August 2017) pages 287-292 (EPO reference XP055593571). The article describes known sound generation at the tip of a fiber by illuminating photo-acoustic materials, as well as generation along the fiber by locally polishing the cladding off the fiber. An improved method is described that couples light from a core mode of the fiber into cladding modes at a position where an absorption layer is provided around the fiber.

SUMMARY

Among others, it is an object to provide for a device and method for performing ultrasonic measurements of fluid properties that is robust for harsh environments and/or with better accuracy.

A method according to claim 1 is provided. An optical fiber issued for optically exciting ultrasound waves at a first location along the optical fiber and optically detecting ultrasound waves at a second location along the fiber. The detection makes use of a fiber Bragg grating or similar device at the second location that produces an optical effect under influence of pressure variation due to the ultrasound wave at the second location. The fiber Bragg grating or similar device may be located in the same optical fiber as from which light is used to excite the ultrasound waves at a first location, or in a further optical fiber in a same packaging as that optical fiber. The optical effect is measured by optical detection at an end of the optical fiber, which may be far apart from the first and second location.

In this way, no electronics is needed in the fluid at the locations where the ultrasound is excited and converted into an optical effect after ultrasound propagation. This increases robustness. Moreover, this makes it possible to make use of fiber based ultrasound propagation modes to measure fluid properties. Thus the effect of reflection from pipe walls or objects in the fluid on the measurements can be reduced. Ultrasound from optical fiber based ultrasound propagation modes can easily be distinguished based on time windows.

In an embodiment the light from the optical fiber that is used to excite the ultrasound waves is an optical pulse, and the detection of arrival of the fiber-based propagation mode at said second location is performed by detecting the effect of the ultrasound waves in a predetermined time range of time delay from the optical pulse, the time range selectively including a travel time needed by ultrasound in a fiber-based ultrasound propagation mode to travel from the first location to the second location. By using a time range that selectively includes such a travel time (i.e. that does not include the travel time needed by ultrasound in other propagation modes) it can be ensured that the fiber based mode of ultrasound propagation used to measure the travel time and/or attenuation.

In an embodiment, a part of the optical fiber and its packaging is located within a pipe, which is much wider than the packaging, and wherein the fluid is present in the pipe between the first and second location. Thus measurements of the local fluid properties in the pipe can be performed more accurately. In an embodiment the optical fiber or the packaging extends between the first and second location, so that the shortest ultrasound travel distance between the locations is along the optical fiber or package. Preferably, the optical fiber or the packaging extends along a straight line between the location or a substantially straight path on which it lies close to the straight line e.g. at a distance of less than ten percent of the length of the straight line. Thus the earliest arriving ultrasound will be due to propagation along the optical fiber or package.

Furthermore the method of claim 1 makes it is possible to perform measurements in harsh environments or environments that are hard to access, such as fuel pipes and tanks in space rockets and pipes in bore holes or in the presence of explosive substances.

In an embodiment, the ultrasound waves are excited by heating the fluid locally at the first location with energy that is directly or indirectly obtained form energy of the light in the fiber at the first location. This can be implemented without much overhead. In an embodiment the ultrasound waves are excited using an oblique partially transparent reflector in the optical fiber at the first location, to reflect part of the light from the optical fiber into the fluid to heat the fluid directly or onto light absorbing material between the fiber and the fluid locally at the first location. In the latter case, thermal contact between the light absorbing material and the fluid is used to heat the fluid. This has the advantage that the ultrasound wave excitation is independent of the light absorption properties of the fluid. When the light is reflected into the fluid, a lens in an opening of the packaging may be used, to focus the reflection at a point in the fluid. This provides for localized excitation.

In an embodiment wherein the optical fiber or the further optical fiber comprises a further fiber Bragg grating at a further location. Fiber Bragg gratings at more than one location make it possible to detect the arrival of the same wave at the different locations. This makes it possible to obtain measurements of fluid properties over different ranges of locations. Furthermore, measurement of travel times obtained by computing the difference between the times of arrival of the same ultrasound wave at fiber Bragg grating at successive locations makes it possible to reduce systematic errors in the measured travel times and attenuations.

In an embodiment, a light pulse through the optical fiber to excite the ultrasound waves and further light is transmitted through the optical fiber or the further optical fiber, to measure reflection and/or transmission of the further light at the second location through the effect of the ultrasound waves on the light in the optical fiber or the further optical fiber at the second location.

A device for performing ultrasonic measurements of fluid properties is provided, the device comprising a light source; an optical fiber configured to transmit light from the light source through the optical fiber; a light driven ultrasound excitation element, configured to transfer light from the optical fiber to fluid outside the optical fiber at the first position, or to a light absorber in thermal contact with the fluid at the first position; an at least partially reflecting surface, or a plurality of partially reflecting surfaces at the second location in the optical fiber, or in a further optical fiber in a same packaging as the optical fiber, at the second location along the optical fiber; an optical detector coupled to the optical fiber and configured to detect an effect of the ultrasound waves on light reflected or transmitted by the at least partially reflecting surface, or plurality of partially reflecting surfaces.

In an embodiment, the device comprises a measurement computer configured to select a detection, by the optical detector, of the effect due to ultrasound waves of a fiber based mode of ultrasound propagation along the optical fiber and/or its packaging, and to compute a travel time and/or attenuation of the ultrasound waves of the fiber based mode of ultrasound propagation. In other embodiments, the device may comprise a recorder for recording the measured effect due to the ultrasound waves, for analysis by a separate measurement computer.

The light source may be configured to generate the light from the light source as an optical pulse, and the measurement computer may be configured to select the detection by detecting the effect of the ultrasound waves in a predetermined time range of time delay from the optical pulse, the time range selectively including a travel time needed by ultrasound in a fiber-based ultrasound propagation mode to travel from the first location to the second location. By using a time range that selectively includes such a travel time (i.e. that does not include the travel time needed by ultrasound in other propagation modes) it can be ensured that the fiber based mode of ultrasound propagation used to measure the travel time and/or attenuation.

BRIEF DESCRIPTION OF THE DRAWING

These and other object and advantageous aspects will become apparent from a description of exemplary embodiments, with reference to the following figures

DETAILED DESCRIPTION OF EXEMPLARY EMBODIMENTS

Figure 1:
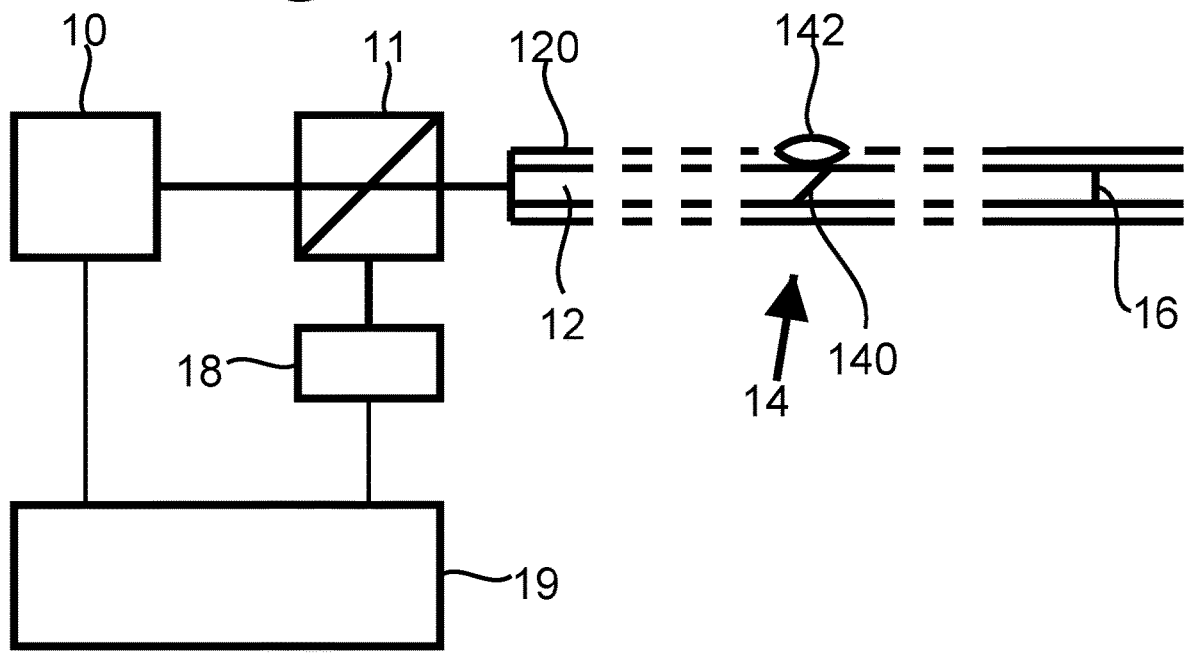
FIG. 1 shows an embodiment of an ultrasound sensing device

FIG. 1 shows an embodiment of an ultrasound sensing device comprising a light source 10, a coupler 11, and an optical fiber 12, wherein optical fiber 12 comprises an ultrasound excitation element 14, a fiber Bragg grating 16 (FBG), an optical detector 18 and a control and measurement computer 19. Light source 10 is configured to produce light for excitation and measurements purposes. Light source 10 is configured to supply the light for excitation as amplitude modulated light, e.g. as a light pulse. Optical fiber 12 is coupled to light source 10 via coupler 11 in order to transmit the amplitude modulated light through optical fiber 12 to ultrasound excitation element 14 and a FBG 16. Coupler 11 may comprise a semi-transparent mirror for example. In an embodiment coupler 11 may be integrated, or partly integrated in optical fiber 12, e.g. by creating an optical coupler using a further fiber locally in parallel with optical fiber 12 and adjacent to it, with light coupling between the fibers. Optical detector 18 is coupled to an output of coupler. Control and measurement computer 19 may comprise a single processor or a plurality of processors.

The length of optical fiber 12 between ultrasound excitation element 14 and FBG 16 may be 0.1 meter for example, or in a range from 0.01-10 meter and more preferably between 0.05 and 0.5 meter, but other lengths may be used.

Ultrasound excitation element 14 is realized as a local light driven heater, configured to heat fluid locally adjacent optical fiber, or a packaging of the optical fiber, at the location of ultrasound excitation element 14 along optical fiber 12. In the illustrated embodiment optical fiber 12 is packaged within a packaging 120 that extends along optical fiber 12. As used herein, the packaging has the form of a flexible cylinder, not necessarily with circular cross-section, of solid material along at least part of the length of the optical fiber extending along a length axis of the cylinder, which keeps the optical fibers in a fixed spatial relation to each other, e.g. at a fixed distance, so that the spatial relation is maintained when the fibers move or bend. Cross-sections of the optical fiber in planes perpendicular to its length are embedded in cross-sections of the cylinder with those planes, each cross-section of the cylinder containing only one cross-section of the optical fiber. Packaging 1209 excludes the fluid from positions that lie between the optical fibers in the cross-sections of packaging 120.

For example the packaging may consist of one or more cladding layers of the fiber (i.e. a layer or layers that assists in confining the light in the optical fiber), or layer that does not affect the light in the optical fiber, or the packaging may comprise both cladding and another layer, or layers, around the cladding. The packaging as used herein should not be confused with a container or wrapping of coiled optical fiber.

Ultrasound excitation element 14 comprises a semi-transparent mirror 140 in optical fiber 12 and a lens 142 in an opening in the packaging, adjacent semi-transparent mirror 140, arranged so that lens 142 focuses light outside fiber and its packaging after this light has been reflected by semi-transparent mirror 140. In the illustrated embodiment, the location of ultrasound excitation element 14 along the fiber is between that of light source 10 and FBG 16. Alternatively, the location of FBG 16 along the fiber may be between those of ultrasound excitation element 14 and light source 10.

In an embodiment of operation at least a portion of optical fiber 12 that contains ultrasound excitation element 14, FBG 16 and the part of optical fiber 12 between excitation element 14 and FBG 16 is located within a pipe through which a fluid flows of which one or more properties have to be measured. The fluid may be a liquid, e.g. as mixture of oil, water and suspended particles.

Figure 1A:
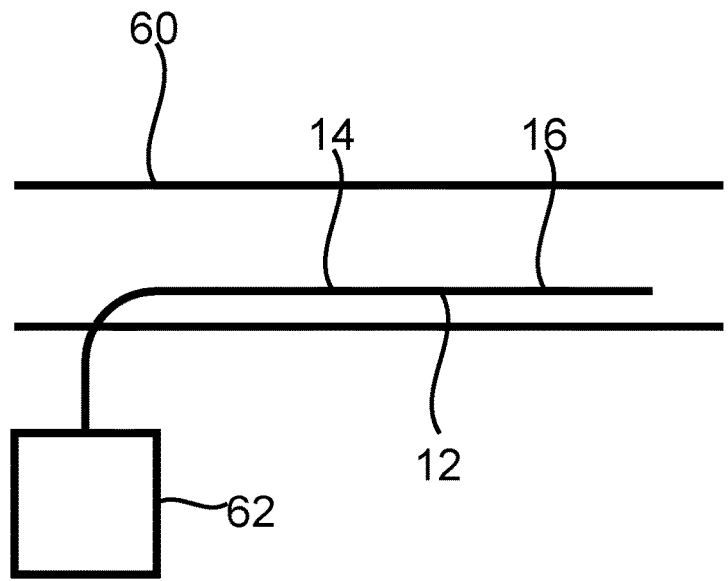
FIG. 1a, 1b show an embodiment of a fluid measuring system FIG. 2a, b illustrate embodiments for measuring the fluid flow speed
Figure 1B:
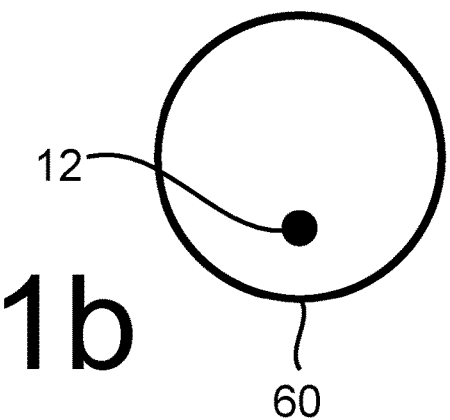

FIG. 1a, 1b show an embodiment of a fluid measuring system containing the device of FIG. 1. The fluid measuring system comprises a pipe 60. A head end 62 of the device, which comprises the light source, the optical detector and the coupler (not shown) is located outside pipe 60. The packaging, which extends along the fiber, is not shown. An excitation and measurement part of optical fiber 12 and its packaging extend along the axial direction of pipe 60. In the illustrated embodiment, the excitation and measurement part of optical fiber 12 extend axially at an off-axis position, at a radial distance from the central axis.

Although head end 62 is shown close to the excitation and measurement part of optical fiber 12, with excitation element 14 and detecting element 16, it should be understood that head end 62 may be much farther removed, with optical fiber 12 transporting the light back and forth between head end 62 and the excitation and measurement part of optical fiber 12.

Although a single off-axis optical fiber 12 is shown the pipe of FIG. 1a, b, optical fiber 12 may be located at the central axis of pipe 60. Moreover it should be understood that a plurality of optical fibers 12 may be provided at different off-axis positions. Ultrasound excitation element 14 and detecting element 16 in the excitation and measurement part are located on the central axis of pipe 60.

In operation, light source 10 produces a pulse of light that travels through optical fiber 12. Control and measurement computer 19 may be configured to cause light source 10 to produce the pulse. Ultrasound excitation element 14 and FBG 16 and at least the part of optical fiber 12 that contains them are in a fluid. The fluid may be water for example, with suspended particles or droplets. At ultrasound excitation element 14, semi-transparent mirror 140 reflects part of the intensity of the pulse out of optical fiber 12. Lens 142 focusses this part of the intensity at a focal point in the fluid, outside optical fiber 12. The focused light quickly heats the fluid, locally in a region containing the focal point, possibly even causing a vapor bubble in the case that the fluid is a liquid. As a result, ultrasound waves having a spectrum of ultrasound wavelengths emanates for this region.

When these ultrasound waves reach FBG 16, they cause pressure variation. The reflection wavelength of FBG 16 varies according the variation. More generally FBG 16 functions to convert an effect of the ultrasound waves at the location of FBG 16 into an optical effect. For this reason, FBG 16 will also be referred to as a detection element, although it should be remembered that optical detector 18 also functions to detect the ultrasound waves, by detecting the optical effect of FBG 16 on light in optical fiber. The FBG is shown as an example of such a detection element, without excluding other embodiments of the detection element.

Furthermore light source 10 produces measurement light, at least during a time interval following the excitation pulse. The intensity of the measurement light may be smaller than that of the excitation light pulse. The reflection of the measurement light by FBG 16 varies with the variation of the reflection wavelength of FBG 16. For example, when narrow band (laser) measurement light is used, the reflected intensity of the measurement light peaks each time when the reflection wavelength of FBG 16 coincides with the wavelength of the measurement light during the pressure variation. Thus, at the arrival of a burst of ultrasound waves, a burst of peaks of reflected light may arise. In an embodiment, a tracking loop may be used to make the wavelength of the measurement light track the reflection wavelength of FBG 16. When broader band measurement light is used, the spectrum of the reflected intensity varies. The reflected measurement light returns to coupler 11 through optical fiber. Coupler 11 feeds the reflected measurement light to optical detector 18. Optical detector 18 detects the intensity and/or spectrum of the reflected measurement light as a function of time. Control and measurement computer 19 receives and records the resulting detection signal from optical detector 18.

It should be noted that ultrasound excitation element 14 and FBG 16 may located at a large distance from light source 10, coupler 11 and optical detector 18. Hence light source 10, coupler 11 and optical detector 18 not need be located in the fluid (nor in the pipe through which the fluid flows). Only optical fiber 12, and in particular its part from ultrasound excitation element 14 to FBG 16 needs to be located in the fluid. Optical fiber 12 transports the excitation light and the measurement light from and to light source 10, coupler 11 and optical detector 18. This increases the robustness of the device against harsh circumstances in the fluid. It obviates the need to provide electrical currents and voltages in or near the fluid, reducing the risk of explosions. When ultrasound excitation element 14 and FBG 16 are located in a borehole, light source 10, coupler 11 and optical detector 18 may be located at or beyond the top of the borehole.

Control and measurement computer 19 is configured to execute a stored, computer readable program or programs of instructions. As used herein, control and measurement computer 19 will be said to be configured to perform operations when the stored program(s) are configured to make control and measurement computer 19 execute these operations, without excluding that part or all of the operations are performed by dedicated hardware in control and measurement computer 19. Control and measurement computer 19 is configured to processes the detection signal, e.g. to determine the time delay between transmission of the pulse and the arrival of ultrasound waves at FBG 16.

The excitation of the ultrasound waves by means of a light pulse will result in one or more bursts of arriving ultrasound waves at FBG 16, and possibly in more extended wave trains. Control and measurement computer 19 may be configured to determine the time delay between the pulse and the arrival of the bursts of ultrasound waves at FBG 16. This time delay may be used to determine the travel time of the ultrasound from the location of ultrasound excitation element 14 to the location of FBG 16. The time delay may be corrected by subtracting the optical travel time of the light through optical fiber 12 from light source 10 to ultrasound excitation element 14 and FBG 16 and back to optical detector 18. However, this correction may be so small that it does not need to be made.

Optionally, control and measurement computer 19 may be configured to make use of wave dispersion to measure the time delay as a function of ultrasound frequency. The light pulse excites ultrasound waves in a broad frequency band, including mainly ultrasound waves with wave periods longer than the pulse duration. When there is dispersion, i.e. when the propagation speed of the ultrasound waves depends on frequency, ultrasound waves of different frequency will arrive at FBG with different time delays. Optical fiber 12 may be designed to increase this effect by increasing the distance between ultrasound excitation element 14 and FBG 16. In embodiments that make use of dispersion, control and measurement computer 19 is configured to determine the frequency of the detected ultrasound waves as a function of time, e.g. from the vibration frequency of the reflection wavelength of FBG 16. Accordingly, control and measurement computer 19 may be configured to determine the time delay between the pulse and the arrival of ultrasound waves at FBG 16 as a function of ultrasound frequency.

Useful Wave Modes

Generally, ultrasound waves may have different modes of travel and detected signals due to different modes can be distinguished based on the time ranges (time windows) wherein they arrive at the positions along the fiber where the signals are detected. Even if the times of arrival of different modes overlap in a same time window, signals detected at different positions along the optical fiber may be combined to extract signals due to individual modes. In an embodiment, control and measurement computer 19 is configured to select detected signals due to one or more individual modes, measure a propagation property or properties of the selected mode(s), such as travel time and/or attenuation, from the selected detected signals and to determine fluid properties from the measured propagation property or properties.

As will be discussed, the modes include fiber-based ultrasound modes, with fluid dependent propagation properties that can easily be measured when the part of optical fiber 12 between ultrasound excitation element 14 and FBG 16 is located entirely in the fluid. Compared to bulk modes (ultrasound waves that travel independent of the fiber, so that they can reflect off the pipe wall), fiber-based ultrasound modes may provide for more accurate measurements because the ultrasound propagation path of fiber-based ultrasound modes drops of quickly with distance to the optical fiber, so that it is not or less affected by the pipe-wall.

In open fluid space, ultrasound waves will travel relative to the fluid with the free space speed of sound of the fluid, e.g. when the fluid is water this speed is about 1500 m/s absent flow. In a pipe ultrasound waves will travel with a similar speed, or speeds of different mode patterns within the pipe that follow from the free space speed. Such ultrasound wave propagation occurs substantially independent of the presence of an optical fiber 12. Ultrasound wave propagation modes that can propagate independent of optical fiber will be referred to as bulk modes.

The fluid properties such as the free space sound speed determine the speed of travel of bulk mode ultrasound waves relative to the fluid. The travel time between the locations of excitation and detection depends on a sum of the ultrasound propagation speed relative to the fluid and the fluid flow speed. When the device of FIG. 1 is used the time delay of the bulk mode due to ultrasound propagation from a first location to a second location on optical fiber 12 will differ from the time delay in the opposite direction by the effect of twice the fluid flow speed along the fiber.

However, the accuracy of the detection of travel times and/or attenuation when the locations of excitation and detections are not far apart is affected by ultrasound reflections of the bulk mode from the pipe wall. Such reflections may make it difficult to distinguish direct propagation, as the reflected modes can reach the location of detection of nearly as fast as direct ultrasound waves. This can also make the measurement dependent on the radial position of the fiber in the pipe. There may be bulk modes with different mode patterns, which can be excited and detected differently, dependent on the radial position of the excitation and detection locations.

Fiber Based Modes

In addition to the bulk mode(s), optical fiber 12 itself may give rise to one or more fiber-based ultrasound modes, of ultrasound that travels in optical fiber 12 or along the interface between optical fiber 12 and surrounding fluid, or its packaging 120 and surrounding fluid (as used herein, the term "fiber-based mode" will be used also to refer to packaging dependent modes).

Use of an optical fiber 12 wherein the part of optical fiber 12 between ultrasound excitation element 14 and FBG 16 is located entirely in the fluid has the advantage that the time delay and attenuation of ultrasound that has travelled entirely according to such a mode from the exciting element to the detecting element substantially depends only on the travel speed and attenuation of the fiber-based modes. As the travel speed and attenuation of the fiber-based modes of a fiber in the fluid depends on properties of the fluid, this makes it possible to measure properties of the fluid from the travel times and/or attenuation of one or more the fiber-based modes. In contrast to the bulk modes the time delay of fiber-based modes depends at most on the fluid flow speed in the vicinity of the fiber. Moreover, the dependence on the fluid flow speed is not simply an addition to the travel time of the traveled distance divided by the flow speed.

The fiber-based modes include guided ultrasound wave modes wherein the ultrasound wave travels mainly through optical fiber 12 and/or its packaging. For an exemplary optical fiber in water, the group speed of such a mode may be about 4000 m/s absent flow. Ultrasound in such wave modes directly stretches and compresses FBG 16 within optical fiber 12 or via packaging 120. Even though such waves remain mainly inside the optical fiber 12 and/or its packaging, its propagation properties are influenced by the properties of the fluid around optical fiber 12.

The fiber-based modes also include surface waves: waves that travel along the surface between the (flowing) fluid and the solid material of the measurement device. Such waves may also be called evanescent waves. As the evanescent wave is partly in the fluid, the fluid properties (e.g. density, flow velocity) influence the evanescent wave. It has been found experimentally that the group velocity (e.g. the pulse propagation speed) of the evanescent waves depends on the fluid flow speed around optical fiber 12. The phase velocity varies linearly with the fluid flow speed (as is known per se the phase velocity is the ratio of the wave vector and the circle frequency and the group velocity is the derivative of the wave vector with respect to the circle frequency). For an exemplary optical fiber in water, the group speed of such a wave may be about 1750 m/s absent flow, that is, between the bulk speed of 1500 n/s and the guided wave speed of 4000 m/s. The group speed may depend on frequency e.g. when the surface wave extends relatively further into the fluid at larger wavelengths than at smaller wavelengths.

The material properties and thickness of both optical fiber 12 and its packaging may be chosen so that such a surface wave exists in the ultrasound frequency range of interest. For example, the materials of optical fiber 12 and its packaging may be selected so that the ultrasound phase speed of the packaging is smaller than that of the fluid and bigger than that of optical fiber. This promotes the existence of a surface waves.

In addition, if the free speed of sound in the fluid is slower than the speed of propagation of a fiber based mode, optical fiber 12 can function according to the principle of a leaky wave antenna for ultrasound waves in such a mode. In a leaky wave antenna, wave energy of the fiber based ultrasound wave gradually leaks out as radiation of ultrasound into the bulk of the fluid, forming a coherent wave front in directions at the same angle with the direction of propagation along the optical fiber. The angle depends on the speed of propagation of the guided wave and the free speed of ultrasound propagation in the fluid. Leakage of ultrasound radiation results in attenuation of the guided wave, which can be described with an attenuation coefficient that depends on the properties of the fluid. The attenuation may be generally proportional to the product of the guided wave speed and the density of the surrounding fluid. Control and measurement computer 19 may be configured to compute the density from the attenuation of this guided wave.

It may also be also possible to detect reflections of the leaked ultrasound radiation from the pipe wall back to optical fiber 12. Dependent on the position of the optical fiber relative to the pipe wall, these reflections can have the effect that excitation of a pulse can lead to detection of a pulse or to time distributed detections. Such detections can be distinguished from other waves based on time of arrival. It has been found that the travel time until reception of such reflected waves at FBG 16 depends on the fluid flow speed and the speed of sound of the fluid.

Detected signals due to the different modes, such as bulk modes, guided modes, reflected guided modes and evanescent modes can be distinguished based on their order of arrival, based on the different time windows (time ranges) in which they are detected at a measurement position along the optical fiber, or from combinations of signals detected at different positions. For example, if the fluid is water, the speeds of the guided mode, the surface wave mode and the bulk mode are 4000 m/s, 1750 m/s and 1500 m/sec respectively, and when the distance between ultrasound excitation element 14 and FBG 16 is 0.1 m, the delay with which these modes arrive at FBG 16 are 25, 57 and 65 microsecond respectively, so that they can be distinguished based on their time of arrival. Generally, for most fluids the sound speeds of the guided mode, the surface wave mode and the bulk mode are successively smaller, as in the case of water.

In an embodiment, the light source is configured to generate the light from the light source as an optical pulse, and the measurement computer is configured to select the detection by detecting the effect of the ultrasound waves in a predetermined time range of time delay from the optical pulse. The measurement computer may be configured to use a time range that selectively includes a travel time needed by ultrasound in a fiber-based ultrasound propagation mode to travel from the first location to the second location. By using a time range that selectively includes such a travel time (i.e. that does not include the travel time needed by ultrasound in other propagation modes, such as bulk modes, guided modes, reflected guided modes and evanescent modes) it can be ensured that the fiber based mode of ultrasound propagation used to measure the travel time and/or attenuation.

Due to dispersion the ultrasound waves of a specific mode need not all arrive at the same time, but generally waves of different ultrasound modes will arrive in different time intervals. Different time ranges for detecting different modes may be set in advance, based on known ranges of travel speed of the different modes for the range of possible fluid properties. Optionally, the time windows may be adapted dynamically, dependent on the detection of pulses due to different modes, or the fluid properties determined from one of the modes. The ultrasound waves in the earliest arriving modes are easiest to distinguish. Generally, these are fiber-based modes rather than bulk modes.

Implementation Versions

Figure 2A:
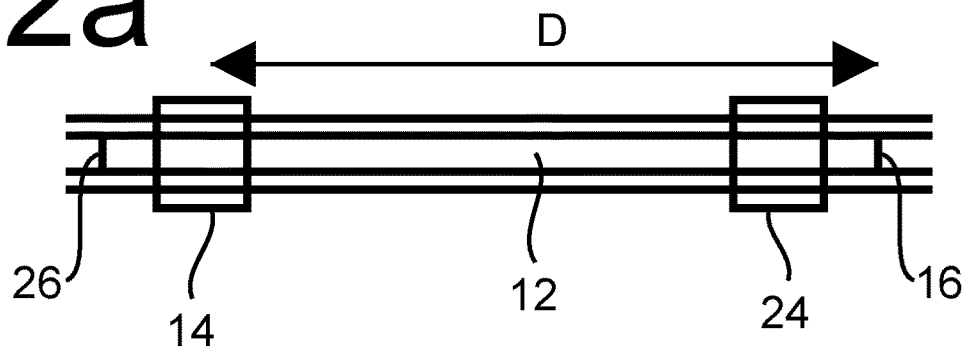
FIG. 2c shows a part of an optical fiber

FIG. 2a, b illustrate embodiments for measuring the fluid flow speed. In the embodiment of FIG. 2a a part of optical fiber 12 is shown that comprises a first combination of a first ultrasound excitation element 14 and a first detection element 16 along optical fiber 12. Furthermore, a second combination of a second ultrasound excitation element 24 and a second detection element 26 is provided. The sequence of the elements differs. In the first combination first ultrasound excitation element 14 is located between the light source (not shown) and first detection element 16 and in the second combination second detection element 26 is located between the light source and second ultrasound excitation element 14. The part of optical fiber 12 between first ultrasound excitation element 14 and first detection element 16 substantially coincides with part of optical fiber 12 between second detection element 26 and second ultrasound excitation element 14 (as used herein substantially coincides means that at least half of both parts coincide and more preferably at least 90%).

Preferably, the distance D between the ultrasound excitation element and the detection element is the same in both combinations. As a result, in the case of a bulk mode, the fluid flow speed V equals $V=\frac{1}{2}*D*(1/T1-1/T2)$, wherein T1 and T2 are the travel times in the first and second combination. In an exemplary embodiment, the distance is about 0.1 m but a different distance may be used. When the distances D1, D2 between the ultrasound excitation element and the detection element in the different combinations, the fluid flow speed V equals $V=\frac{1}{2}*(D1/T1-D2/T2)$. In an embodiment control and measurement computer 19 is configured to select detections of the bulk mode, based on arrival in the time range for such modes, to measure T1 and T2 from their detected time of arrival and to compute V based on these measurements. When first and second detection element 16, 26 are FBGs, each may be designed to reflect light of a different wave length, so that the times of arrival of the bulk node may be detected simultaneously, using measurements at the different wave lengths.

Although the relation $V=\frac{1}{2}*D*(1/T1-1/T2)$ (or $\frac{1}{2}*(D1/T1-D2/T2)$), with the fluid flow speed applies to bulk modes, a similar arrangement may also be used to measure time delays in opposite directions for fiber-based modes. For fiber-based modes that extend into the fluid, the time delay between transmission and arrival also depends on the fluid flow. But a correction factor may be needed to determine the fluid flow speed.

Figure 2B:
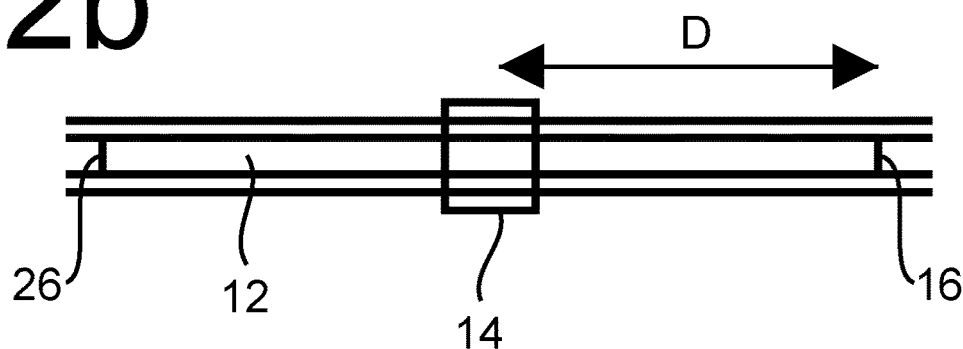

In the embodiment of FIG. 2b a single ultrasound excitation element 14 is used in combination with a first and second detection element 16, 26 along optical fiber 12 on opposite sides of the ultrasound excitation element 14.

Preferably first and second detection element 16, 26 are located at the same distance D to ultrasound excitation element 14. As a result, control and measurement computer 19 may be configured to compute the fluid flow speed V in the same way as for the embodiment FIG. 2a. The embodiment of FIG. 2a has the advantage that it provides a more accurate local flow speed in the case of flow speed gradients.

In addition, control and measurement computer 19 may be configured to compute the speed of sound C of the bulk mode relative to the fluid flow from the sum of the travel times C=0.5*D*(1/T1+1/T2) or 0.5*(D1/T1+D2/T2. This speed of sound depends on fluid properties such as fluid density and bulk modulus, and changes in the measured speed of sound may be used to detect changes in these quantities. A similar computation may be used for fiber-based modes. In this case the computed quantity is substantially independent of the fluid flow speed, but it is not equal to the speed of sound C of the bulk mode. Rather the computed quantity corresponds to a propagation speed that depends in a predetermined way on the fiber and its packaging as well. Control and measurement computer 19 may be configured to use the predetermined relation between the computed quantity and fluid properties to determine fluid properties from such a quantity. In an embodiment, control and measurement computer 19 may comprise a memory with a look-up table that relates a values of a quantity like the speed or attenuation of a specific type of wave to fluid property values. In another embodiment, control and measurement computer 19 may comprise a memory with a look-up table that relates a feature of the frequency dependence of the speed or attenuation of a specific type of wave to fluid property values. In an embodiment control and measurement computer 19 may be configured to compute the value of the speed and/or attenuation at a predetermined ultrasound wave frequency and look-up fluid property values from a table for that frequency (the computation of the value the speed and/or attenuation may comprise computing a Fourier transform of the time dependence of the received signal). In other embodiments, control and measurement computer 19 may comprise a fitting program, configured to fit fluid property values to the ultrasound and/or attenuation or their frequency dependence.

Figure 2C:
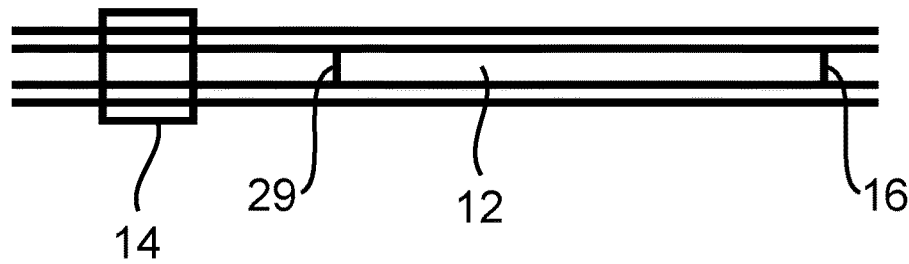

FIG. 2c shows a part of optical fiber 12 in an embodiment with an ultrasound excitation element 14 and first and second detection elements 16, 29 along optical fiber 12 on the same side of ultrasound excitation element 14. In this embodiment, the travel time of an ultrasound wave between first and second detection elements 16, 29 may be determined from the time interval between the detection of arrival of the ultrasound wave at the first and second detection elements 16 and 29. This makes it possible to improve the accuracy of the travel time measurement. Travel time measurement obtained by computing the difference between the times of arrival of the same ultrasound wave at detection elements 16, 29 at successive locations makes it possible to reduce systematic errors in the measured travel times and attenuations. This method of determining travel times from the difference between the time of arrival at different detection elements may be applied to the embodiments of FIG. 2a, b, for example by using ultrasound excitation elements on opposite sides of the part of optical fiber 12 between first and second detection elements 16, 29. Control and measurement computer 19 is configured to compute the travel times dependent on the embodiment that is used.

Instead of detection elements 16, 19 in the same optical fiber, detection elements in different optical fibers in the same package may be used. In addition to the two detection elements more detection elements optical fiber or the further optical fiber may be used. This makes it possible to detect the arrival of the same wave at the different locations, which makes it possible to obtain measurements of fluid properties over different ranges of locations. Already with first and second detection elements 16, 29 travel times in the location range between the excitation element and first detection elements and in the location range between first and second detection elements can be distinguished. In an embodiment the fiber or the fiber and a further fiber in the same package contain a first and second excitation element, at different locations along the fiber, with two or more detection elements at locations between those of these excitation elements. This makes it possible to measure the travel times in different directions.

Control and measurement computer 19 may be configured to compute ultrasound travel times and/or attenuation of fiber-based modes, of bulk modes or both. Control and measurement computer 19 is configured to select detection of ultrasound from these modes based on their order of arrival, the time range in which the ultrasound arrives at a position along the optical fiber, or a combination of signals detected at different positions. As noted, the ultrasound propagation of fiber-based modes depends less on the fluid flow speed than the ultrasound propagation of bulk modes. As far as it depends on fluid flow speed, it depends primarily on the local flow speed in the region where the optical fiber is located.

As noted, the group velocity of the surface waves has been found to depend on the fluid flow speed around optical fiber 12. The phase velocity varies linearly with the fluid flow speed. In an embodiment, control and measurement computer 19 is configured to compute the local fluid flow speed from the measured group velocity of the evanescent wave. The attenuation of the guided wave may be used to measure fluid density when the fluid flow speed is measured.

Figure 3:
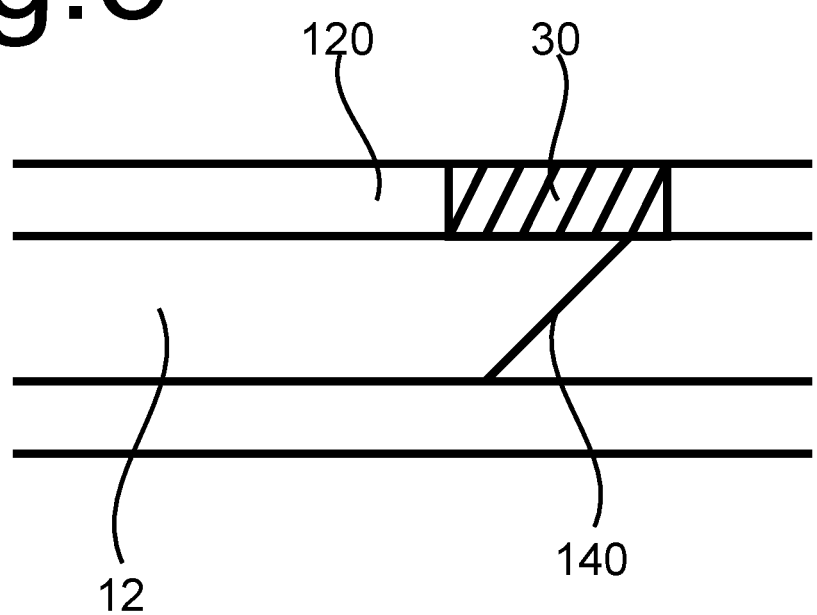
FIG. 3 shows an embodiment comprising a body of light absorbing metal

Although FIG. 1 shows an example of an ultrasound excitation element 14 comprising a semi-transparent mirror 140 in optical fiber 12 and a lens 142, it should be appreciated that other implementations of ultrasound excitation element 14 are possible. FIG. 3 shows an embodiment comprising a body of light absorbing metal 30 (e.g. Tungsten) instead of lens 142. In this embodiment, the pulse heats the body of light absorbing metal 30 and the body of light absorbing metal 30 heats the fluid.

In another embodiment an ultrasound excitation element may be realized by means of light absorbing material or a lens at the tip of the optical fiber, configured to receive light from the optical fiber. In such ultrasound excitation elements semi-transparent mirror 140 is not needed. In embodiments with the ultrasound excitation element at the tip of optical fiber 12 the FBG 16 will be located in the optical fiber at a distance from the tip, e.g. at 0.1 m. Similarly, FBG may be located at the tip with the ultrasound excitation element at a distance from the tip.

In the described embodiments, FBG 16 is used as an ultrasound detection element. But different means of optical detection may be used. Instead of a single FBG 16, a plurality of FBGs configured to reflect light of different optical wavelengths at different positions along the fiber may be included in optical fiber 12. In this embodiment, a plurality of optical detectors for detection at the different optical wavelengths may be used in parallel with optical detector 18. This may be used to detect ultrasound vibrations at the different positions along the optical fiber. Control and measurement computer 19 may be configured to use such a plurality of FBGs to determine fluid properties dependent on position in the fluid, and/or to improve the signal to noise ratio of the measured fluid properties.

Instead of an FBG 16, a pair of mutually spaced single reflectors may be used in optical fiber 12, each with a substantially wavelength independent reflection coefficient, wherein at least the reflector closest to light source 10 is partially transparent. In this embodiment, the pair of single reflectors functions as an interferometer, which reflects light that is a combination of reflections from the single reflectors in the pair. Ultrasound wave effects in the part of optical between the single reflectors affect the optical path length between the single reflectors, and hence the phase difference between the components of the combination of reflections. Optical detector 18 may be used to detect the resulting intensity variation due to interference between these components. A plurality of pairs of partially transparent spaced single reflectors may be included at different positions in optical fiber 12 to obtain interference from the different positions.

In another embodiment, the end of the optical fiber is used as an optical reflector, instead of using the FBG. In this embodiment the time difference between excitation and detection of the reflection is used to measure a travel time of the ultrasound wave. As is well known per se, the end of the optical fiber may cut to form a planar surface that reflects back light in the fiber.

Figure 4:
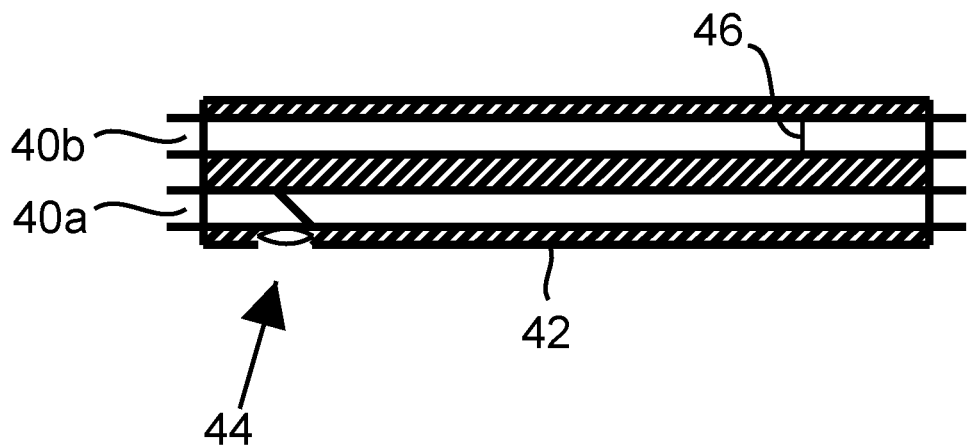
FIG. 4 shows an embodiment with more than one optical fiber

FIG. 4 shows an embodiment wherein the optical fiber of FIG. 1 has been replaced by a first and second optical fiber 40a, b, both in the same packaging 42. In the illustrated embodiment, an ultrasound excitation element 44 similar to the disclosed ultrasound excitation element 14 is included in first optical fiber 40a. Second optical fiber 40b comprises a detection element 46 such as an FBG or a pair of reflectors. The shared packaging supports fiber-based ultrasound modes excited by optical pulses transmitted through first that optical fiber 40a, which are detected using reflection from detection element 46. This makes it possible to detect ultrasound fiber-based modes, while at the same time using different optical fibers 40a,b for excitation and detection.

In another embodiment, ultrasound excitation elements may be included in both fibers and/or detection elements 46 may be included in both fibers. For example excitation elements detection elements located as described in relation to in FIGS. 2a-c may be used, but located distributed over different fibers, for example to minimize the maximum number of detection elements in any fiber, or to avoid having more than one ultrasound excitation element in any fiber, or to avoid use of an ultrasound excitation element in the same fiber as the detection elements. In a further embodiment more than two optical fibers may be used in the same packaging to achieve any of these goals.

Figure 5:
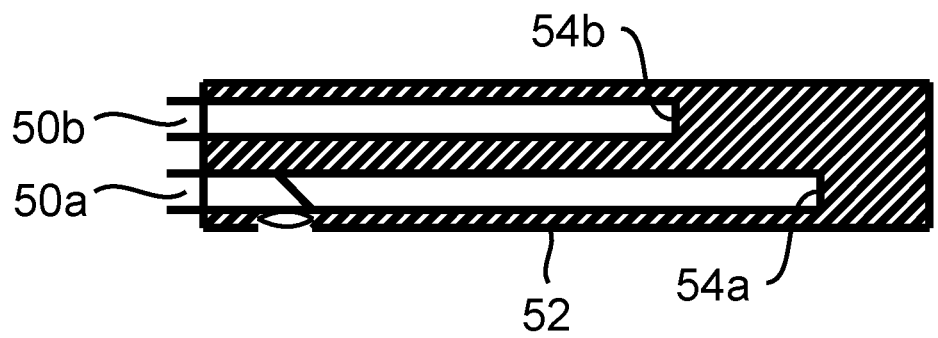
FIG. 5 shows another embodiment with more than one optical fiber

FIG. 5 shows another embodiment with a first and second optical fiber 50a, b, both in the same packaging 52. At the ends of the fibers, reflectors 54a,b are provided. In this embodiment, interference between light reflected via the first and second optical fiber 50a, b may be used to detect the ultrasound waves. For this purpose an optical combiner (not shown) may be provided, with inputs coupled to the entrances of the fibers. Instead of terminated fibers 50a,b with end reflectors, ongoing fibers with embedded partially transparent reflectors may be used.

In a further embodiment, the ultrasound excitation element and the detection element(s) may be located in different optical fibers that are not in the same packaging. For example, a first optical fiber may contain two or more detection elements, that may be used to measure travel time and/or attenuation of a fiber-based ultrasound wave travelling along the first optical fiber, after excitation of that ultrasound wave by an ultrasound excitation element in a second optical fiber that is not in the same package as the first optical fiber. When measurements are performed using fiber-based modes, this preferably requires that the second optical fiber is close to the first optical fiber. However, this is easier to achieve by using a single fiber or fibers in the same packaging.

Although embodiments have been described wherein the excitation light and the measurement light are supplied to the same end of the optical fiber as where the reflected light is detected, this is not necessary. Instead, or in addition, transmission of the measurement light may be detected, for example by including an optical reflector at the end of the fiber. Alternatively, the light may be excited and detected at the opposite end of the optical fiber. When a looped optical fiber is used, the optical detectors for such transmission measurements may be located in the same unit as the light source. In this case, the optical finer may run from the unit, through a pipe, within the pipe along a bend and back from the bend to the unit through the pipe. Also, the excitation light and the measurement light may be supplied from opposite ends of the optical fiber, in which case reflection of the measurement light may be detected at the same end of the optical fiber where the measurement light is supplied and/or transmission of the measurement light may be detected at the opposite end of the optical fiber.

In principle an ultrasound wave may be excited with a first optical fiber and detected with a second optical fiber also when the first and second optical fibers do not form part of the same package. Similar measurements are possible in this case. However, use of fibers that are not part of the same package creates complications because the relative spatial relation of the fibers may affect the measurements and it may be difficult to keep the fibers in a fixed relative spatial relation. Moreover, Part of the travel time may be due to propagation between the fibers according to an unidentified wave mode. This may create more complicated relations between fluid properties and travel time or attenuation. Use of two detection elements in the second fiber could overcome part of these problems (cf. the embodiment of FIG. 2c), but use of a single optical fiber, or optical fibers that are fixed relative to each other by means of a package, considerably simplifies the use of the ultrasonic measurements.

Although embodiments have been described wherein the ultrasound waves are excited by means of a light pulse, it should be noted that instead the ultrasound waves may be excited by light with a periodic amplitude modulation. As a result, the detected ultrasound will be periodic. In this case the travel time may be determined from the phase difference between the excited and detected ultrasound, or between ultrasound detected at different locations. In other embodiments, other time dependent excitation patterns may be used. In that case a ratio between the Fourier transforms of the detected signal and the excitation signal may be used to determine the fluid properties. For example a random or pseudo random excitation pattern may be used.

The invention claimed is:
1. A method of performing ultrasonic measurements of fluid properties of a fluid, the method comprising:
exciting ultrasound waves at one location along an optical fiber in the fluid by light from the optical fiber; and
detecting, at another location along the optical fiber in the fluid, an effect of the ultrasound waves on light reflection in the optical fiber or light propagation through the optical fiber.

2. The method according to claim 1, comprising selecting a detection of arrival of a fiber-based propagation mode at the another location, the effect of the ultrasound waves on light propagation being detected from the selected detection.

3. The method according to claim 2, wherein the light from the optical fiber used to excite the ultrasound waves is an optical pulse, the detection of arrival of the fiber-based propagation mode at the another location being performed by detecting the effect of the ultrasound waves within a predetermined time range of time delay from the optical pulse, the time range selectively including a travel time needed by ultrasound in a fiber-based ultrasound propagation mode to travel from the one location to the another location.

4. The method according to claim 1, wherein the exciting is performed by heating the fluid locally at the one location with energy that is directly or indirectly obtained from energy of the light in the fiber at the one location.

5. The method according to claim 4, wherein the exciting is performed by means of a partially transparent reflector obliquely in the optical fiber at the one location, the partially transparent reflector reflecting light from the optical fiber into the fluid or onto light absorbing material between the fiber and the fluid locally at the one location, the light absorbing material being in thermal contact with the fluid at the one location.

6. The method according to claim 5, wherein the exciting is performed using the reflection of light from the first optical fiber from the partially transparent reflector into the fluid, through a lens in an opening of the packaging of optical fibers, the lens focusing the reflection in the fluid.

7. The method according to claim 1, wherein the effect comprises displacement of an at least partially reflecting surface, or relative displacement of a plurality of partially reflecting surfaces, at the another location.

8. The method according to claim 7, wherein the optical fiber comprises a fiber Bragg grating at the another location, the effect being an effect of the ultrasound waves on wavelength dependence of light reflection or transmission by the fiber Bragg grating.

9. The method according to claim 8, wherein the optical fiber comprises a further fiber Bragg grating at a further location along the optical fiber, the method comprising measuring an ultrasound travel time and/or attenuation of ultrasound propagating between the another location and the further location from detections using the fiber Bragg grating and the further fiber Bragg grating.

10. The method according to claim 7, wherein the another location is at the end of the optical fiber.

11. The method according to claim 1, comprising:
transmitting a light pulse through the optical fiber, the ultrasound waves being excited by means of the light pulse,
transmitting further light through the optical fiber, and
measuring reflection and/or transmission of the further light in the optical fiber.

12. A device for performing ultrasonic measurements of fluid properties, the device comprising:
a light source;
an elongated member configured to be arranged in the fluid for performing ultrasonic measurements of fluid properties of the fluid, wherein the elongated member comprises:
an optical fiber configured to transmit light from the light source through the optical fiber;
a light driven ultrasound excitation element arranged at one position along the elongated member and configured to transfer light from the optical fiber to the fluid outside the elongated member, or to a light absorber in thermal contact with the fluid outside the elongated member; and
an at least partially reflecting surface, or a plurality of partially reflecting surfaces located at one or more other locations along the elongated member arranged in the fluid;
wherein the elongated member comprises at least one of the group consisting of:
an optical fiber configured to be arranged in the fluid, the optical fiber comprising both the light driven ultrasound excitation element and the at least partially reflecting surface, or the plurality of partially reflecting surfaces; and
a packaging of optical fibers configured to be arranged in the fluid, the packaging of optical fibers comprising at least a first optical fiber and a second optical fiber, the first optical fiber comprising the light driven ultrasound excitation element and the second optical fiber comprising the at least partially reflecting surface, or the plurality of partially reflecting surfaces; and
an optical detector coupled to the optical fiber and configured to detect an effect of the ultrasound waves on light reflected or transmitted by the at least partially reflecting surface, or the plurality of partially reflecting surfaces.

13. The device according to claim 12, comprising a measurement computer configured to select a detection, by the optical detector, of the effect due to ultrasound waves of a fiber based mode of ultrasound propagation along the optical fiber and/or its packaging, and to compute a travel time and/or attenuation of the ultrasound waves of the fiber based mode of ultrasound propagation.

14. The device according to claim 13, wherein the light source is configured to generate the light from the light source as an optical pulse, and the measurement computer is configured to select the detection by detecting the effect of the ultrasound waves in a predetermined time range of time delay from the optical pulse, the time range selectively including a travel time needed by ultrasound in a fiber-based ultrasound propagation mode to travel from the one location to the another location.

15. The device according to claim 12, comprising:
a partially transparent reflector obliquely in the optical fiber, and
a lens in an opening of the packaging,
wherein the lens is configured to focus light that has been reflected from the optical fiber by the partially transparent reflector in fluid around the packaging at the one location.

16. The device according to claim 12, comprising:
a partially transparent reflector obliquely in the optical fiber, and
a light absorber configured to be in thermal contact with a surrounding of the packaging at the one location.

17. The device according to claim 12, wherein an ultrasound phase speed of the packaging is smaller than that of the fluid.

18. A method of performing ultrasonic measurements of fluid properties of a fluid using a packaging of optical fibers arranged in the fluid, wherein the packaging of optical fibers comprise at least a first optical fiber and a second optical fiber, and wherein the method comprises:

exciting ultrasound waves at one location along the packaging of optical fibers in the fluid by light from the first optical fiber; and detecting, at another location along the packaging of optical fibers in the fluid, an effect of the ultrasound waves on light reflection in the second optical fiber or light propagation through the second optical fiber.

19. The method according to claim 18, wherein the fluid in which the packaging of optical fibers is arranged, is contained within a pipe.

20. The method according to claim 19, wherein at least a part of the optical fiber between the one location and the another location is located in a fuel pipe or tank in a rocket or a pipe in a bore holes or in the presence of an explosive substance.

21. The method according to claim 19, wherein the pipe is wider than the packaging of optical fibers.

22. The method according to claim 18, wherein the packaging of optical fibers is formed as a flexible cylinder of solid material.

23. The method according to claim 18, wherein the packaging is configured to have an ultrasound phase speed which is smaller than that of the fluid and bigger than that of the optical fiber.

* * * * *